United States Patent
Lin et al.

(10) Patent No.: US 6,791,952 B2
(45) Date of Patent: *Sep. 14, 2004

(54) ASYMMETRIC DATA ACCESS SCHEME

(75) Inventors: Jie Lin, Torquay (GB); Keith Russell Edwards, Paignton (GB); Richard John Driscoll, Totnes (GB)

(73) Assignee: Nortel Networks Limited, St. Laurent (CA)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/962,287

(22) Filed: Oct. 31, 1997

(65) Prior Publication Data

US 2001/0006517 A1 Jul. 5, 2001

(51) Int. Cl.$^7$ .............. H04J 1/00; H04Q 7/00
(52) U.S. Cl. .............. 370/281; 370/329; 370/344; 370/352
(58) Field of Search .............. 370/280, 281, 370/276, 294, 295, 328, 329, 330, 334, 341, 344, 347, 431, 436, 442, 468, 352, 353, 354, 401; 455/403, 422.1, 450

(56) References Cited

U.S. PATENT DOCUMENTS

| | | | |
|---|---|---|---|
| 5,113,339 A | | 5/1992 | Komatsu et al. |
| 5,485,578 A | | 1/1996 | Sweazey |
| 5,515,509 A | * | 5/1996 | Rom .............. 395/200.1 |
| 5,633,915 A | | 5/1997 | Yang et al. |
| 5,936,580 A | * | 8/1999 | Van Puijenbroek .......... 343/700 |
| 5,949,763 A | * | 9/1999 | Lund .............. 370/261 |
| 5,953,659 A | * | 9/1999 | Kotzin et al. .............. 455/422 |
| 5,960,046 A | * | 9/1999 | Morris et al. .............. 375/347 |
| 5,970,062 A | * | 10/1999 | Bauchot .............. 370/345 |
| 5,991,311 A | * | 11/1999 | Long et al. .............. 370/524 |
| 6,023,615 A | * | 2/2000 | Bruckert et al. .......... 455/277.2 |
| 6,038,455 A | * | 3/2000 | Gardner et al. .............. 455/447 |
| 6,122,263 A | * | 9/2000 | Dahlin et al. .............. 370/329 |
| 6,219,547 B1 | * | 4/2001 | Qaddoura et al. .......... 455/432 |
| 6,359,866 B1 | * | 3/2002 | Svensson et al. .......... 370/331 |

FOREIGN PATENT DOCUMENTS

| | | |
|---|---|---|
| EP | 0 720 329 | 7/1996 |
| EP | 0 732 834 | 9/1996 |
| GB | 2 232 562 | 12/1990 |
| GB | 2 304 499 | 3/1997 |
| JP | 07/079 245 | 3/1995 |
| WO | WO 95/20852 | 8/1995 |
| WO | WO 96/26588 | 8/1996 |
| WO | WO 96/27835 | 9/1996 |
| WO | WO 97/12456 | 4/1997 |

OTHER PUBLICATIONS

Digital Audio Broadcasting, EUREKA–147 Project, Aug. 1997.

(List continued on next page.)

Primary Examiner—Brian Nguyen
(74) Attorney, Agent, or Firm—Barnes & Thornburg

(57) ABSTRACT

The disclosure relates to an asymmetric data access scheme eg Internet access scheme, over a fixed wireless access network. The disclosure provides apparatus for bandwidth efficient provision of asymmetric data services operating a method of communicating between a radio base station and a plurality of subscriber terminals, each subscriber terminal comprising a subscriber antenna. Each sector of a tri-sectored cellular arrangement operates a plurality of frequency division duplex pairs, plus one or more additional unpaired downlink frequencies. On the uplink, packet switched data is transmitted on the conventional access channel, eg ALOHA, but on the downlink, packet switched data is transmitted on an unpaired downlink frequency over a broad sectorized beam.

11 Claims, 5 Drawing Sheets

OTHER PUBLICATIONS

"The Slotted Aloha Protocol", *BYTE Articles Bytemarks Facts Links VPR Talk*, Apr. 1996/Reviews/E–Mail Without Wires, downloaded from: http://www.byte.com/art/9604/sec12/art7.htm, Sep. 18, 1997, 1 page.

"CSMA–CD", downloaded from: http://www.seas.upenn.edu/~ross/lectures/ethernet/csma cd.htm, Sep. 18, 1997, 3 pps.

"Reservation Aloha", downloaded from: http://mars.mcs.kent.edu/mac/node58.html, Sep. 18, 1997, 2 pps.

"CS143 HW #3", downloaded from: http://das–www.harvard.edu/cs/academic/courses/cs143/hw/hw3.html, Sep. 18, 1997, 2 pps.

"Contention Protocols", downloaded from: http://cs.uregina.ca/~holroyd/CS306/lectnote.html, Sep. 18, 1997, 7 pps.

Liu, "Performance analysis of DS/CDMA with slotted Aloha Random access for packet PCNs", *Wireless Networks*, vol. 1, No. 1, Feb. 1995, pps. 1–16, downloaded from: http://www.acm.org/pubs/toc/abstracts/wireless/207630.html.

Lee et al., "Slotted Aloha in High Speed Bidirectional Bus Networks", *LIDS–P–2097*, Mar. 1, 1992, 1 page, downloaded from: http://donald–duck.mit.edu/lidspubs/2097.html.

Lee et al., "Space–Time Characteristic of Aloha Protocols in High Speed Bidirectional Bus Network", *LIDS–P–2153*, Dec. 1, 1992, downloaded from: http://donald–duck.mit.edu/lids/pubs/2153.html, 1 page.

\* cited by examiner

ASYMMETRIC DATA ACCESS SCHEME

FIELD OF THE INVENTION

The present invention relates to a method and apparatus for data access over a wireless link, in which a greater data rate may be provided in one direction of a link than in an opposite direction of the link.

BACKGROUND OF THE INVENTION

In a fixed wireless access (FWA) telecommunications system, subscribers are connected to a backbone telecommunications network by means of radio links in place of traditional copper wires. Each of a plurality of subscribers is provided with a subscriber radio terminal at their subscriber premises. A base station provides cellular coverage, typically in urban environments over a 5 km radius, with the plurality of subscriber radio terminals. Each base station may be connected to a backbone network, eg a Public Switched Telecommunications Network (PSTN) switch via a conventional transmission link, known as a backhaul link thereby providing the plurality of subscribers with access to the PSTN. A single base station can serve of the order of up to two thousand subscribers, making the installation and maintenance cost of a fixed wireless access system lower than that of an equivalent copper wire access network.

Referring to FIG. 1 herein, there is illustrated schematically a radio base station and subscriber terminal of a prior art fixed wireless access system. A plurality of subscriber radio terminals 100 each comprising a transceiver 101 and an antenna 102 communicate with a radio base station 103 having a base station antenna 104 and a base station transceiver apparatus 105. A plurality of such radio base stations 103 each communicate with a central office switch 106 to gain access to a backbone telecommunications network, eg a Public Switched Telephone Network (PSTN). In a geographical area, a plurality of base stations are distributed to provide coverage in a cellular pattern. Each base station 103 is connected to a local exchange switch 106 via a backhaul transmission line 107 which may comprise for example a terrestrial line eg fiber optic cable or coaxial cable, or a microwave transmission link. Communication between the subscriber radio terminal and the base station is via a wireless radio link 108. Each local wireless link 108 between radio base station 103 and subscriber radio terminal 100 comprises an uplink from the subscriber antenna to the radio base station antenna, and a downlink transmitting from the radio base station antenna to the subscriber antenna and transceiver. Each radio base station operates either an omni-directional beam or a plurality of broad sectorized beams encompassing all subscribers in a cell or sector for receive and transmit, whereas each subscriber radio terminal operates a directional pencil beam directed at the base station for receive and transmit. In a prior art fixed wireless access deployment, although each nominally hexagonal cell is served by a base station located nominally at the center of the cell, current technologies permit the base station antenna to be located non-centrally within a cell area.

In the prior art fixed wireless access system a frequency spectrum allocation for the uplink is typically of a same bandwidth as a frequency spectrum allocation for the downlink. For example, the uplink may be allocated 15–17 MHz bandwidth in an available radio spectrum, and the downlink may be allocated a further 15–17 MHz bandwidth of frequency spectrum. The uplink and downlink spectrums are spaced apart by typically around 50 MHz, referred to as duplex spacing.

Typically, the uplink frequency allocation of 15 MHz is subdivided into a plurality of 300 KHz slots each occupied by a separate carrier frequency, giving 48 uplink carriers. For a 17 MHz uplink band, divided into a plurality of 300 KHz uplink frequency slots, 54 uplink carriers are available. Similarly, the allocated downlink frequency spectrum is subdivided into a plurality of 300 KHz downlink frequency slots, being symmetric with the uplink frequency allocation.

The 300 KHz frequency slots are allocated to a plurality of radio base stations over a geographical area according to a repeating frequency reuse pattern. To minimize the likelihood of interference, adjacent cells within a fixed wireless access network, or sectors within each such cell are allocated distinct groups of radio frequencies selected so as to minimize the likelihood of a transmission with any cell (or sector of a cell) causing interference in any other cells or sectors nearby. On the uplink, in a three of nine reuse pattern, every ninth frequency is reused, so although only 18 of the 54 available carrier frequencies are used per cell, the frequency pattern can be reused indefinitely, and an allocation of subscriber radio terminals to base stations giving service to around 2000 subscribers per cell can be replicated indefinitely over a geographical area.

Thus, typically in a 17 MHz uplink case, each base station may operate 18 carriers, 6 per sector, in a tri-sectored arrangement. Each carrier frequency is separated into 10 bearer time slots, providing 60 uplink bearer time slots per sector (180 bearers per cell). Of these, 2 to 6 bearer time slots per sector are reserved for an access channel, through which subscriber radio terminals request access to the radio base station leaving 54 bearer time slots per sector available for subscriber usage. Each subscriber radio terminal operates two subscriber lines, so taking account of the bearers reserved for access channels, up to a maximum of 27 radio subscriber terminals in a sector can communicate with a base station at the same time. However, as usage of subscriber terminals is statistical in nature, up to approximately 600 to 700 subscribers per sector can be accommodated since not all subscribers communicate at once.

Similarly, in the 17 MHz downlink band, the downlink frequency allocation at each base station is 18 carriers per cell, each downlink carrier corresponding to an uplink carrier in a frequency division duplex pair. In each sector, there are 6 downlink carrier frequencies, corresponding with the 6 uplink frequencies, to form 6 frequency division duplex pairs per sector. As with the uplink carrier frequencies, the downlink carrier frequencies are time division multiplexed into a plurality of bearer timeslots. Some of those bearer timeslots are used as a downlink broadcast channel which advertises available bearer timeslots to all subscribers within a sector.

For circuit switched services carried over the wireless link, where those services are characterized by having symmetric constant data rate traffic both on the uplink and downlink, eg voice traffic, the prior art symmetric allocation of frequency spectrum between the uplink and downlink beams is relatively efficient. However, for services which entail an asymmetric data rate requirement as between the uplink and the downlink, for example where the volume of traffic data on the uplink differs greatly from a volume of traffic data on the downlink, a symmetric frequency spectrum allocation for the uplink and downlink beams is inefficient. For example, taking an instance of a subscriber making Internet communications on a user terminal 109, connected to a subscriber radio terminal 100, a request for data sent to an Internet service provider 110 on the uplink may comprise a transmission of packets of tens or hundreds of Bytes. On the other hand, service data provided by the Internet service provider may comprise data units of the order kBytes or MBytes. Such data is downloaded from the local exchange 106 over the backhaul system 107 through the base station 103 and over the downlink. In a circuit switched application, the bandwidth is reserved and available for use for uplink and downlink communications throughout the duration of a communications session. During the download of data from the Internet, the uplink path remains reserved for use by the subscriber, although no data traffic may be actually flowing on that uplink.

In a fixed wireless access network deployment having a plurality of subscribers each communicating with a base station, under conditions of services of asymmetric data rate, having a symmetric frequency spectrum allocation for a downlink and uplink path for each subscriber represents an inefficient use of frequency spectrum.

However, in many applications, a symmetric frequency allocation is all that is available, due to prior allocation of frequencies by license. Frequencies may become available due to de-commissioning of legacy equipment using symmetric uplink and downlink frequencies and any replacement equipment must make use of the symmetric frequencies allocations becoming available.

In addition to the wasteful allocation of spectrum on the uplink, while data is being transmitted only on the downlink in the conventional circuit switched FWA system, there is also an additional inefficiency due to a time overhead associated with connection setup and tear-down, which adds further to the overall inefficiency of symmetric circuit switched fixed wireless access networks when carrying data traffic having an asymmetric downlink/uplink data flow.

SUMMARY OF THE INVENTION

One object of the invention is to provide an improved apparatus and method for fixed wireless access network operating a symmetric uplink and downlink frequency spectrum allocation, enabling such a network to transport services characterized by having an asymmetric data rate as between uplinks and downlinks, more efficiently over the symmetrically allocated uplink/downlink frequency spectrums.

According to a first aspect of the present invention there is provided in a cellular communications system comprising a plurality of base stations, each communicating with a plurality of subscriber radio terminals, a method of communicating between a radio base station and a said plurality of subscriber radio terminals, said method comprising the steps of:

at said base station:

receiving packet switched data carried on an uplink frequency of a frequency division duplex pair; and transmitting packet switched data on a downlink distribution channel carried on an unpaired downlink frequency.

Preferably said uplink packet switched data is carried on a contention access channel.

Said contention access channel may comprise a slotted ALOHA channel.

Preferably said uplink packet switched data shares said contention access channel with a plurality of connection requests for circuit switched traffic.

Said uplink packet switched data may comprise a request for services having an asymmetric data rate as between a source and a destination of said service.

According to a second aspect of the present invention there is provided a method of communicating between a radio base station and a plurality of subscriber radio terminals, said method comprising the steps of:

receiving a plurality of service requests from said plurality of subscriber radio terminals at said radio base station;

recognizing said service requests received at said radio base station;

in response to a said service request, forwarding said service requests to a service provider apparatus;

receiving service data in response to said service request signal; and transmitting said service data to said plurality of said subscriber radio terminals.

Preferably said step of receiving a said service request comprises receiving said service request over a directional uplink transmission beam.

Preferably said step of transmitting said service data comprises transmitting said service data on a sectorized downlink beam.

Preferably said service requests are received on an uplink access channel and said service data is transmitted on an unpaired downlink frequency.

Preferably said downlink distribution channel carries data traffic in response to one or a plurality of service requests received on an uplink access channel.

According to a third aspect of the present invention there is provided a method of allocating frequency spectrum slots at a radio base station, said radio base station configured for communicating with a plurality of subscriber radio terminals, said method comprising the steps of:

allocating a plurality of frequency division duplex pairs for communication between said subscriber radio terminal and said plurality of radio base stations, each said frequency division duplex pair comprising an uplink frequency and a downlink frequency; and allocating an unpaired frequency for communicating on a downlink from said base station to said plurality of subscriber radio terminals.

Preferably said unpaired downlink frequency is operated to carry packet switched data.

Preferably said radio base station operates a plurality of sectorized beams, and a said unpaired downlink frequency is operated for each said sectorized beam.

The invention includes a radio base station configured for operating the method as described in the third aspect.

According to a fourth aspect of the present invention there is provided a method of allocating bearer channels at a radio base station, configured for communicating with a plurality of subscriber radio terminals, said method comprising the steps of:

allocating a plurality of paired bearer channels for carrying circuit switched data, each said bearer channel pair comprising an uplink channel carried on an uplink frequency slot, and a downlink bearer channel carried on a downlink frequency slot; and allocating packet switched data to a plurality of unpaired downlink bearer channels.

Preferably said unpaired bearer channels are carried on an unpaired downlink frequency, and said paired bearer channels are carried on one or a plurality of frequency division duplex pairs.

According to a fifth aspect of the present invention there is provided a radio base station comprising:

a first antenna and transceiver apparatus configured to operate a plurality of frequency division duplex pairs, each said frequency division duplex pair comprising an uplink frequency and a downlink frequency;

a second antenna and a transmitter apparatus configured for transmitting at least one unpaired downlink frequency.

Said first antenna and transceiver apparatus may comprise means for distinguishing between service request signals for packet switched data services and connection request signals for circuit switched services received on said uplink frequencies of said frequency division duplex pairs; and means for routing service data received in response to said service requests, to said second antenna and transmitter for broadcast of said service data by said second antenna and transmitter.

Preferably the base station operates to transmit packet switched data on said second antenna and transmitter.

Said subscriber radio terminal may further comprise:
an antenna for receiving and transmitting over a frequency division duplex pair comprising an uplink frequency and a downlink frequency;
a transceiver apparatus configured for transmitting on said uplink frequency and receiving on said downlink frequency of said frequency division duplex pairs; and
a receiver configured for receiving signals on an unpaired downlink frequency.

Said subscriber radio terminal may further comprise a multiplexer, wherein said receiver operates to receive signals from said antenna via said multiplexer, said multiplexer operating to multiplex between signals assigned to said transceiver and signals assigned to said receiver.

Said subscriber radio terminal may comprise a further antenna adapted for receiving said signals on said unpaired downlink frequency, wherein said receiver operates to receive signals from said further antenna.

The invention includes an asymmetric data access scheme, wherein short message uplink traffic is carried on a shared access uplink channel.

The uplink channel may carry Internet data requests.

The invention includes a fixed wireless access base station operable to provide asymmetric data access and operable to receive and route uplink traffic received via a shared access channel. The uplink channel may comprise Internet data requests.

The invention includes a fixed wireless access subscriber apparatus operable to provide asymmetric data access and operable to receive and route uplink traffic received via a shared access channel.

The fixed wireless access system may comprise a proxy server. The system may comprise a fixed wireless access base station wherein the proxy server is located at said base station.

The invention includes a radio transmission system comprising a local subscriber interface and a radio interface and adapted to communicate with a remote base station by means of an access channel, wherein an Internet request is emitted from the radio interface, encoded on the access channel responsive to receipt of the Internet request on the local subscriber interface.

The invention includes a satellite base station operable to provide asymmetric data access and operable to receive and route uplink traffic received via a shared access channel. The uplink traffic may comprise Internet data request.

The invention includes a satellite subscriber apparatus operable to provide asymmetric data access and operable to receive and route uplink traffic received via a shared access channel.

Said uplink traffic may comprise Internet data requests.

The invention includes a satellite system comprising a proxy server. The system may comprise a base station wherein said proxy server is located within said satellite.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION OF THE BEST MODE FOR CARRYING OUT THE INVENTION

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without using these specific details. In other instances, well known methods and structures have not been described in detail so as not to unnecessarily obscure the present invention.

Further, the techniques disclosed herein are applicable in a number of frequency division duplex systems, eg North American AMPS (Advanced Mobile Phone System), PCS (Personal Communications System), or CDMA (Code Division Multiple Access). Further, it will be realized that whilst the specific embodiments and methods disclosed herein describe specifically a fixed wireless access application, the general techniques employed are equally suitable for application in satellite links.

Figure 2:
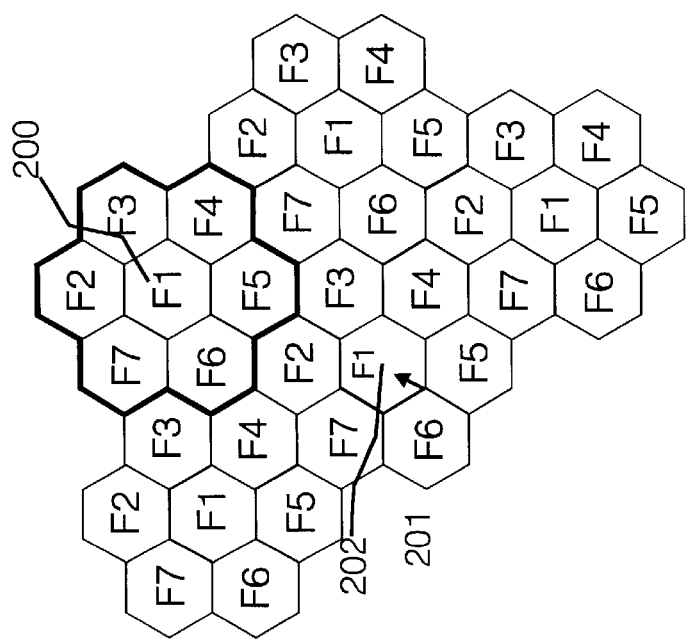
FIG. 2 illustrates schematically a prior art cellular coverage arrangement in an un-sectored fixed wireless access network, including an example frequency allocation plan suitable for services having symmetric uplink and downlink data rates.

Referring to FIG. 2 herein, there is illustrated an example of a downlink frequency allocation plan for a prior art arrangement of hexagonal cells within a fixed wireless access network, having a deployment of omni-directional base station antennas. Each of a plurality of base stations provides coverage for a nominally hexagonal cell area. A cluster pattern of seven frequencies F1–F7 covering seven cells is duplicated across the network. In order to avoid interference between adjacent base stations, and subscriber transmissions, distinct frequency groups are allocated as between adjacent cells. No two adjacent cells utilize a same or like carrier frequency. Carrier frequencies are reused between base stations which are sufficiently far apart from each other, so as not to cause interference with each other, thereby increasing the overall capacity of the fixed wireless access network by reuse of carrier frequencies.

Figure 1:
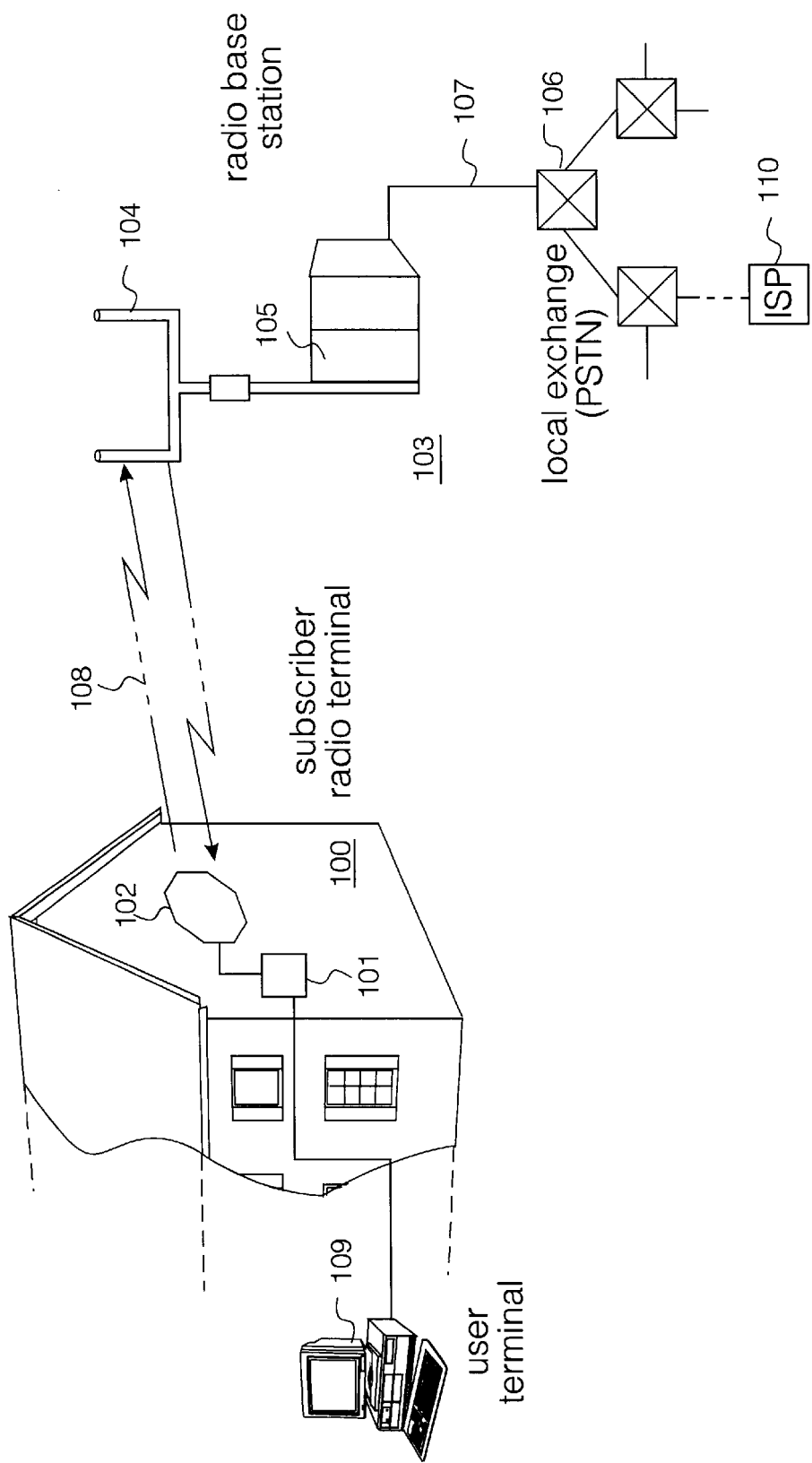
FIG. 1 illustrates schematically a radial base station and subscriber terminal of a prior art fixed wireless access system.
Figure 3:
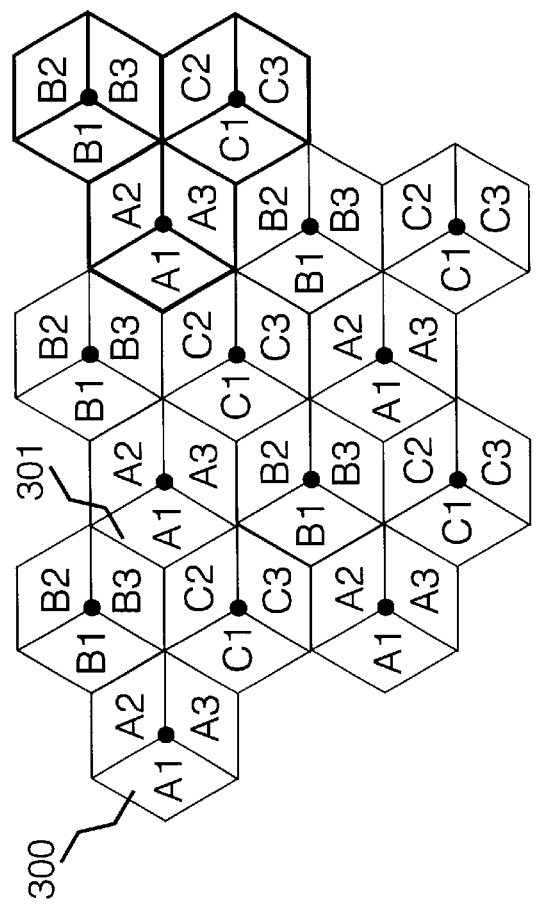
FIG. 3 illustrates schematically a prior art cellular coverage arrangement and frequency allocation plan for a prior art sectored fixed wireless access network, having 3 sectors per cell.

Referring to FIG. 3 herein there is illustrated a downlink frequency plan for a prior art tri-sectored center excited cellular arrangement, in which each base station at the center of a corresponding respective nominally hexagonal cell radiates three beam patterns per hexagonal cell, each beam pattern having different frequencies. Greater frequency reuse is achieved in the tri-sectorized arrangement as compared with the omni-directional cells of FIG. 2 herein. In the tri-sectored center excited cellular arrangement of FIG. 3 each base station is adapted to transmit and receive on distinct frequencies over directional downlink and uplink beams within the cell. In FIG. 3, the symbols A1–A3, B1–B3, and C1–C3 are used to indicate distinct frequency groups allocated to individual sectors. Carrier frequencies are chosen to be sufficiently far apart from each other so as not to interfere with adjacent sectors or cells. In each nominally hexagonal cell, there are 18 carrier frequencies. Each frequency group comprises a set of 6 carrier frequencies. For example, frequency group A1 of first sector 300 comprises frequencies $f_1$–$f_6$. The same frequency group A1 is re-used in spaced apart first tier frequency re-use sector 301.

Referring again to FIG. 2 herein, the following example illustrates an imbalance between uplink and downlink interference. For a prior art arrangement of a plurality of, for example, 6 subscriber transceivers communicating with a single base station in an omni-directional cellular base station layout, on a base station to subscriber downlink, assuming a frequency reuse of 1, there is only one possible base station interferer 200 for a subscriber radio terminal having a directional beam 201 aimed at base station 202. However, for a base station receiving uplink frequencies omni-directionally, there are potentially 6 cells from which interference can occur around each base station, these being the first tier frequency reuse cells. On the uplink, since each base station has 6 subscriber interferers in its surrounding cell, there are potentially six interferers surrounding each base station, one in each of the adjacent first tier frequency reuse cells to that base station. Thus, there is an in-built interference imbalance between the downlink and the uplink which manifests itself as a difference in carrier signal to noise and interference ratio (CNIR) between downlink and uplink paths.

The CNIR imbalance is mitigated due to the statistical nature of transmissions. Whilst the downlink beams are non-statistical, ie always on, the uplink beams are statistical, only transmitting when connections are made. However, under circumstances where many subscribers communicate simultaneously, for a single subscriber wireless link, the worst case interference on the uplink exceeds the worst case interference on the downlink.

Taking as a comparison, an example of a prior art center excited hexagonal cell having a trisected uplink beam pattern as shown in FIG. 3 herein, instead of an omni-directional uplink beam pattern, the uplink interference position improves compared to the omni-directional case, since the trisected uplink beam receives interference from only two first tier frequency reuse cells, assuming a frequency reuse factor 1. However, there is still an imbalance in potential worst case interference between the downlink and the uplink for communication between a subscriber and a base station.

Different traffic types can tolerate different levels of interference. For circuit switched traffic, for example carrying voice transmission, a high integrity of transmission is required since the nature of the traffic is such that intermittence of a connection cannot be tolerated. However, for packet switched data a higher degree of connection intermittence can be tolerated since packet switched data is less delay sensitive than voice data, and can often be retransmitted.

Communication is said to be circuit switched where a transmission resource between a source and a destination is guaranteed reserved for the use of a user for the duration of a session, whether that resource is used continuously or not (for example a normal voice telephone call). An example of this is where a specific timeslot or code is reserved for the duration of a call, whether or not a person is speaking. Conversely, communication is said to packet switched where transmission resources are not guaranteed to be reserved for the duration of a user's session, but are allocated only as and when required during a user session (for example in a data packet network). Circuit switched channels may be described as being deterministic, whereas packet switched channels may be described as being non-deterministic.

Whilst in the case of fixed wireless access a circuit switched symmetric approach to allocation of transmission resources makes acceptable use of available radio bandwidth for largely continuous services having substantially symmetric data rate in either direction, (for example voice traffic, where a volume of traffic in one direction may be approximately equal to a volume of traffic in an opposite direction) it would nevertheless be highly wasteful of the limited radio bandwidth across a fixed wireless access link to operate a circuit switched mode where data transfer is intermittent, or where data transfer is asymmetric in nature, having a large amount of data in one direction and a smaller amount of data in an opposite direction across the fixed wireless access link. An example of such an asymmetric intermittent usage pattern arises in subscriber access to the transmission control protocol/Internet protocol (TCP/IP) Internet, for example access to the World Wide Web (WWW), User Groups, file transfer protocol (FTP), or Bulletin Board. Such Internet interactions typically take the form of a relatively short information request transmitted by a subscriber on an uplink (eg of the order of a few tens of bytes) each information request potentially resulting much larger amounts of data being downloaded to the subscriber via a downlink (eg many K/Bytes or even M/Bytes of data).

Specific embodiments and methods according to the present invention may take advantage of a difference between the carrier to noise and interference ratio quality as between the uplinks and downlinks arising from the use of highly directional antennas at the subscriber radio terminals whereby the worst case downlink carrier to noise and interference ratio is better than the worst case uplink carrier to interference and noise ratio, to introduce an overlaid channel for communicating packet switched data.

Figure 4:
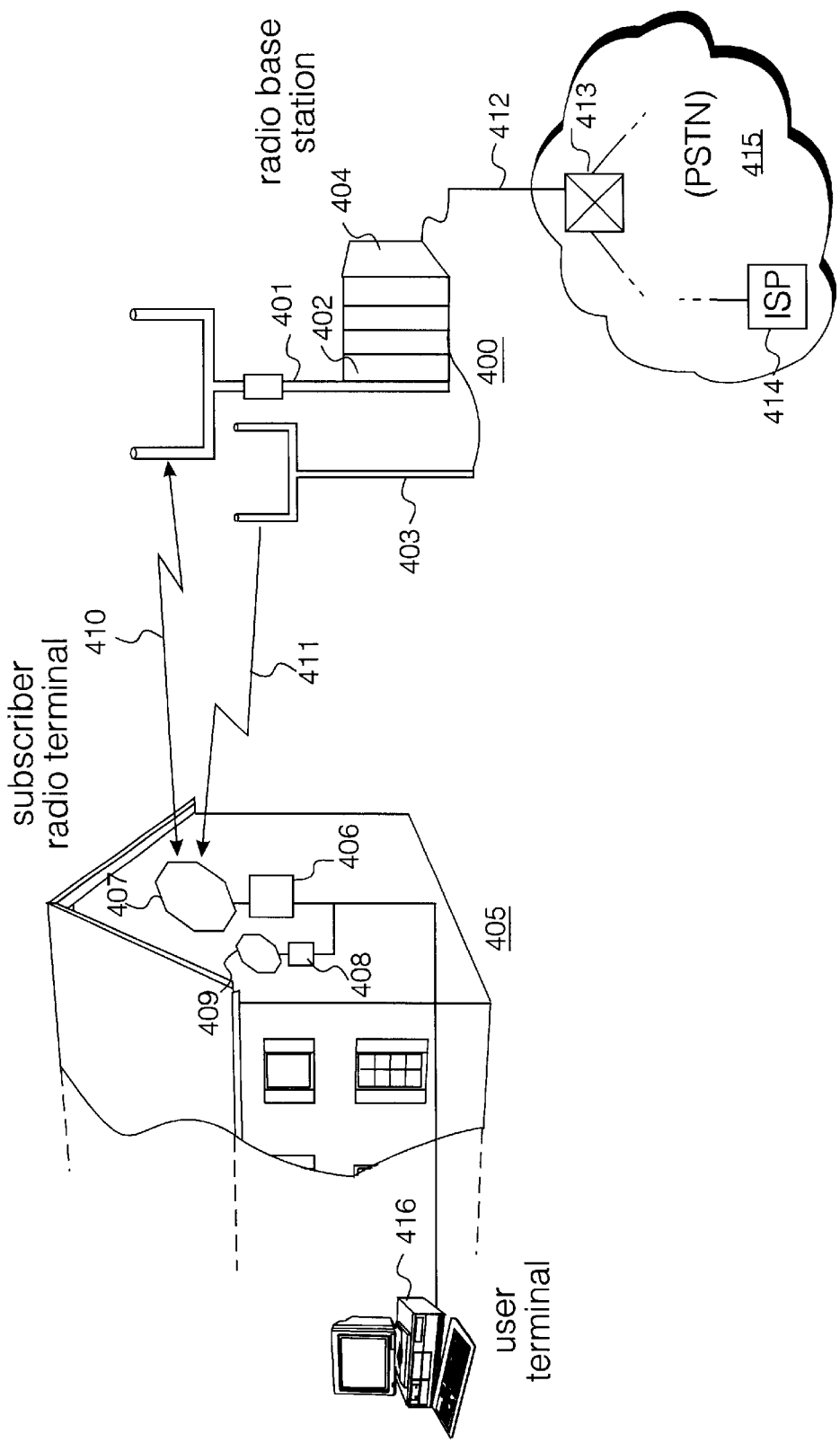
FIG. 4 illustrates schematically an example of a fixed wireless access system according to a first specific embodiment of the present invention, adapted for supporting services having asymmetric data transmission rates as between uplink and downlink.

Referring to FIG. 4 herein, there is illustrated schematically a fixed wireless access system according to a first embodiment of the present invention. A radio base station 400, comprises a main antenna 401 and main transceiver 402 and is also provided with an auxiliary antenna 403, and a supporting auxiliary transmission apparatus 404. The radio base station 400 serves a plurality of subscriber radio terminals 405, each comprising a subscriber transceiver 406 and a subscriber antenna 407. Each subscriber to the system is provided with, in addition to the conventional subscriber radio terminal comprising subscriber antenna 407 and subscriber transceiver 406, a downlink access receiver 408 for receiving downlink transmissions from the auxiliary base station equipment. At the subscriber premises, the downlink access receiver 408 may optionally be provided with its own downlink access antenna 409, or alternatively may be connected to the existing conventional subscriber antenna 407 by means of a multiplexer. Communication between the base station main antenna 401 and subscriber transceiver 406 is by means of the conventional fixed wireless access link, represented in FIG. 4 by the bidirectional arrow 410, comprising a frequency division duplex pair consisting of a first frequency $f_1$ used for an uplink between the subscriber transceiver and the base station main antenna, and a second frequency $f_2$ used for transmission from the base station main antenna to the subscriber transceiver. Additionally, a third wireless link 411 operating on the downlink only is provided for transmission at a third frequency $f_3$ from base station auxiliary antenna 403 to the subscriber premises. The third wireless link 411 is received either by the subscriber antenna 407 and subscriber transceiver 406, or by the downlink access antenna 409 and downlink access receiver 408. Base station 400 in a tri-sectored arrangement provides a separate base station main antenna 401 for each nominal 120° azimuth sector, as well as a separate base station auxiliary antenna 403 for each 120° sector. Base station 400 is connected by conventional backhaul transmission line 412 to a conventional local exchange 413 which connects the radio base station to an Internet service provider 414 accessible over a backbone communications network 415, eg a Public Switched Telephone Network (PSTN). User terminal 416 eg a personal computer, at a subscribers premises is provided with access to Internet services via the downlink access receiver 408.

Figure 5:
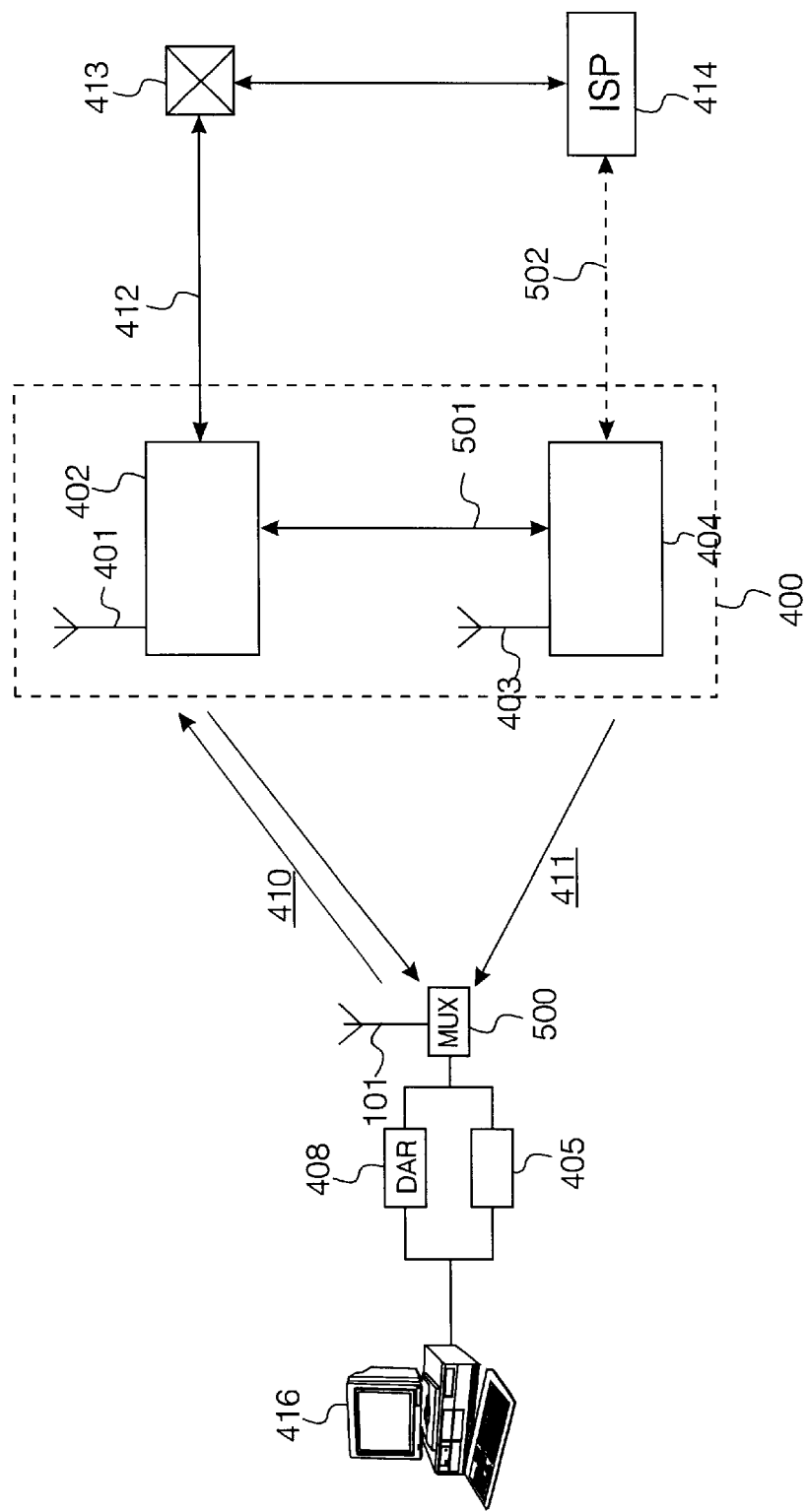
FIG. 5 illustrates schematically the fixed wireless access system as illustrated in FIG. 4 in logical view.

Referring to FIG. 5 herein, there is illustrated schematically a logical view of base station 400, and a single subscriber radio terminal according to a specific embodiment of the present invention. The subscriber radio terminal embodiment shown comprises a single subscriber transceiver 406 serving downlink access receiver 408 via a multiplexer 500. Base station main transceiver 402 communicates with base station auxiliary transmission apparatus 404 via an internal bus 501. Base station auxiliary transmission apparatus 404 may be connected directly to Internet service provider 414 by a private leased line 502.

Base station 400 operates one or more unpaired frequencies on the downlink only, transmitted from base station auxiliary antenna 403 and base station auxiliary transmitter 404. The base station main antenna 401 and base station main transceiver 402 operate a plurality (typically 6 per sector) of frequency division duplex pairs, each comprising an uplink carrier frequency and a corresponding downlink carrier frequency. The unpaired downlink carrier frequencies operated by base station auxiliary antenna 403 and base station auxiliary transmitter 404 are additional to and overlaid on the frequency division duplex pairs. The additional overlaid unpaired downlink carrier frequencies can be accommodated on the downlink by taking advantage of the difference in CNIR between the uplink between a subscriber and the base station and the downlink, arising out of the spatial asymmetry of the broad sectorized beam of the base station antennas, and the narrow directional pencil beams of the subscriber antennas.

Figure 6:
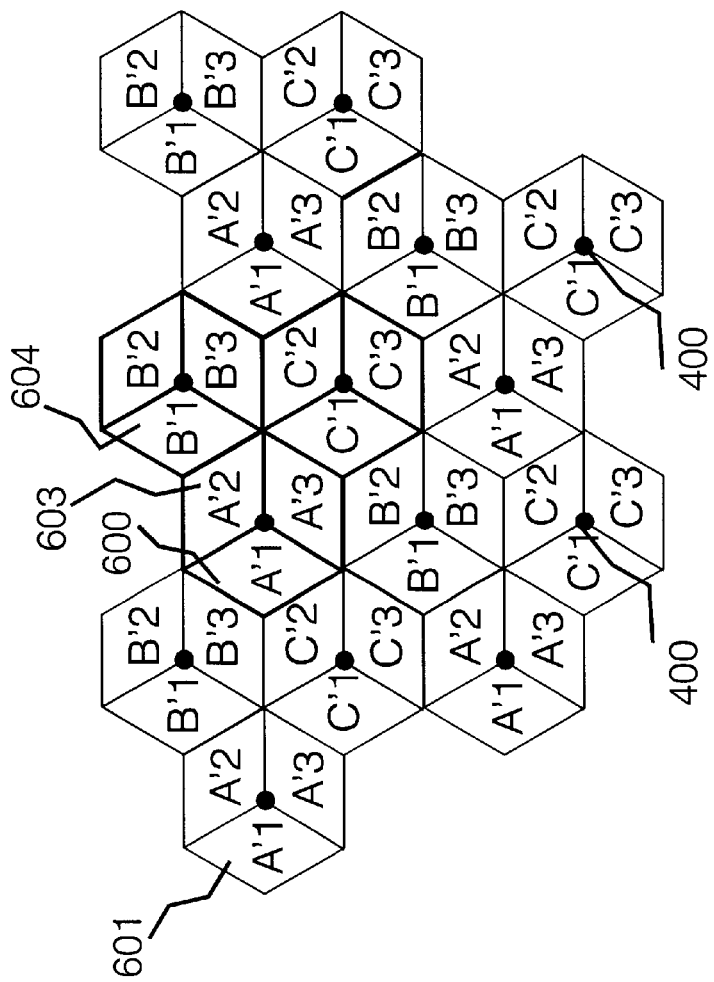
FIG. 6 illustrates schematically a frequency re-use plan for a plurality of base stations and a plurality of subscribers according to a specific method of the present invention.

Referring to FIG. 6 herein, there is illustrated schematically a downlink frequency plan according to a specific implementation of the present invention. Each of a plurality of nominally hexagonal geographical cell areas are served by a corresponding respective centrally located base station 400 as described with reference to FIGS. 4 and 5 herein. Each base station operates a tri-sectored downlink azimuth beam pattern, in each sector operating a group of six frequency division duplex pairs, each comprising a downlink frequency and an uplink frequency, as described in the prior art arrangement of FIG. 3. In each sector, one or more additional unpaired downlink frequencies are transmitted by corresponding auxiliary base station antenna 403. In a preferred implementation, the unpaired downlink carrier frequency supports a plurality of downlink distribution channels for distributing packet switched data, eg Internet data. The separate unpaired downlink frequency is transmitted from a corresponding respective auxiliary base station antenna 403 provided one per sector, at central base station 400.

Whilst the subscriber antenna operates a narrow directional radiation beam exhibiting a relatively high gain, the base station antenna is typically less focused than the subscriber antenna beam, being much broader and exhibiting significantly lower gain. The relatively narrow, directional subscriber antenna beams pencil beams, typically may have a 3 dB beamwidth of about 20° and a gain of around 18 dBi whereas the base station antenna beam may typiclly have a −3 dB beamwidth of the order 85°, and occupies a 120° sector. Consequently, the downlink is less susceptible to interference than the uplink.

The frequency plan of the best mode herein takes advantage of the difference in carrier to interference and noise ratio (CNIR) between the uplink and downlink, to provide at least one extra downlink carrier frequency per sector compared with the prior art case of FIG. 3, the extra downlink frequency being unpaired, having no corresponding uplink frequency. For each sector, the additional one or more unpaired downlink carrier frequencies are selected out of a frequency group assigned from a sector other than a first tier frequency re-use sector. For example, for sector 600 in FIG. 6, frequency group A'1 comprises a group of A1 of paired downlink frequencies $f_1-f_6$ each having a corresponding respective uplink frequency, plus one or more additional unpaired downlink frequency selected from a sector other than a first tier frequency reuse sector 601, 602 also operating frequency group A'1. For example, the additional unpaired downlink frequency in sector 600 may be selected from paired frequency groups A2, A3, B1–B3 or C1–C3.

In a first implementation, the unpaired downlink frequencies of each sector may be fixed to a sector. For example unpaired downlink frequency $f_7$ may be permanently assigned to sector 600, having paired downlink frequencies $f_1-f_6$, so that group A' comprises paired downlink frequency group A1 and unpaired downlink frequency $f_7$.

In a second implementation, the unpaired downlink frequencies may be dynamically selected from frequency groups of non-first tier frequency group re-use cells in real time. For example, unpaired downlink frequency $f_7$ of a first sector 600 operating paired frequency group A1 (downlink frequencies $f_1-f_6$) may be selected from a downlink frequency of a non-reuse paired frequency group A2 of a sector 602 for a first period of time. The unpaired downlink frequency of first sector 600 may then be changed, being selected as downlink frequency $f_{22}$ of paired frequency group B1 in sector 604.

Each sector operates a group of paired downlink frequencies plus one or more unpaired downlink frequencies, the unpaired downlink frequencies being selected from a paired non-frequency re-use group, that is to say, selected from a group of paired downlink frequencies which are different to the group of paired downlink frequencies used in the sector. By periodically re-selecting the unpaired downlink frequency from paired non-frequency reuse groups, any additional interference caused by its presence over surrounding sectors may be evenly distributed. Frequency swapping of the unpaired downlink frequency may be effected practically by use of a frequency synthesizer in the auxiliary base station equipment.

In the second implementation, the downlink distribution channels may be statically fixed to a single unpaired downlink carrier frequency or may float from unpaired to paired downlink carrier.

Since radio links are potentially error prone, a known link protocol such as an Automatic Retransmission reQuest (ARQ) scheme, may be used to improve the quality of the transport. Since higher level end-to-end protection is provided at a higher level protocol layer, eg transmission control protocol (TCP) layer, there is no need for the automatic retransmission request to be absolutely error free.

An example of operation of the base station and subscriber radio terminal of FIGS. 4 to 6 will now be described. Operation in respect of a single sector is described, and it will be appreciated by the skilled reader that a single base station may operate three or more sectors similarly as described herein.

Subscriber transceiver 100 of the subscriber radio terminal communicates packet switched data, over a conventional uplink contention access channel eg slotted ALOHA, which is received by base station 400 on base station main antenna 401 and base station main transceiver 402.

The uplink transmitted packet switched data may be for example a service request for asymmetric data services, eg Internet services provided by Internet service provider 414, or alternatively may be a short message, for example an e-mail message. The packet switched data shares the conventional uplink access channels with the normal connection requests for circuit switched connections which are transmitted by a plurality of subscriber radio terminals requesting bearer slot resources when subscribers wish to make circuit switched connections.

To establish a subscriber initiated connection over prior art fixed wireless access system, the subscriber radio terminal first breaks in to communicate with the base station on a common predefined access channel using a standard contention protocol and requests establishment of duplex connection. For example, the known slotted ALOHA protocol may be used, in which each subscriber station receives to a single downlink broadcast channel which broadcasts data describing a list of bearer time slots and a time slot within those carrier frequencies. Each subscriber radio terminal stores a periodically updated list of preferred carrier frequencies, which are selected according to local propagation characteristics, and compares the broadcast bearers with its stored list of carrier frequencies. The subscriber radio terminal transmits a request signal, whenever it has data to send, reserving a selected bearer for use by the subscriber radio terminal. If there is no collision between two subscriber stations requesting a duplex connection at the same time, a receiver at the base station sends an acknowledgment signal over the fixed wireless access broadcast channel. On successful establishment of a duplex connection, the provider network allocates an available channel (or channels) on one of its frequencies for the connection, and initiates use of that channel for the uplink and for the downlink of the requested connection. This channel is assigned to the connection for the duration of the call, regardless of the volume of traffic passing in either direction.

Since the packet switched data shares the conventional uplink access channels, and requests for circuit switched connections also occupy these channels, in the best mode herein the packet switched data is configured to yield channel capacity on the access channel, giving priority to circuit switched connection requests. Typically an amount of data in an uplink packet switched communication over the contention access channel may be of the order of a few hundred bytes. For data packets of greater length, use of the contention access channel may lead to significant delays, and for such data sent on the uplink, use of the conventional circuit switched channel may be preferred. Similarly, on the unpaired downlink frequency, although this carrier is an additional resource to the plurality of frequency paired downlinks, the unpaired frequency downlink is similarly configured to give priority to circuit switched traffic carried on the unpaired downlink frequency.

For example, a subscriber at user terminal 416 wishing to web browse turns on user terminal 416 and operates conventional web browse software within the terminal, which generates packet switched data. The packet switched data is converted at the subscriber radio terminal in a form which can be transmitted on the conventional slotted ALOHA contention access channel. Signals transmitted from the subscriber radio terminal to the main base station antenna 401 on the slotted ALOHA access channel are received at base station main transceiver 402. Base station main transceiver 402 operates conventional fixed wireless access air interface protocols, and may determine which subscriber radio terminal is originating the packet switched data received on the contention access channel. However, base station main transceiver 402 does not recognize information contained in the packet switched data received on the contention access channel, but is configured to distinguish only between packet switched data, and a conventional connection request. At the subscriber radio terminal, the packet switched data is transmitted over the wireless link on the contention access channel in accordance with the standard air interface protocol. Base station main transceiver 402 is configured conventionally to recognize requests for circuit switched traffic received on the ALOHA contention access channel, and may respond to such connection requests for circuit switched services as in the conventional case. However, additionally base station main transceiver 402 is configured to distinguish between a connection request for circuit switched services and packet switched data received on the slotted ALOHA contention access channel.

On determining that packet switched data has been received on the contention access channel, base station main transceiver sends the packet switched data over internal bus 501 to base station auxiliary transmission apparatus 404. Base station auxiliary transmission apparatus 404 contains a database listing subscriber radio terminal identification data, and corresponding Internet protocol addresses for user terminals at those respective subscriber radio terminals. The database information is configured during provisioning of the subscriber radio terminals, or provisioning of the asymmetric data service on existing subscriber radio terminals. Base station auxiliary transmission apparatus 404 determines from the air interface protocol address received over local bus 501, a corresponding Internet protocol address of a user terminal at that subscriber radio terminal, from the look up table. Base station auxiliary transmission apparatus 404 converts the received packet switched data from a form suitable for carrying over the wireless link to a form which is recognizable by Internet service provider 414. Base station auxiliary transmission apparatus 404 may communicate with Internet service provider 414 by a variety of mechanisms, depending on configuration of the auxiliary transmission apparatus. Where the auxiliary transmission apparatus is connected to Internet service provider 414 by private leased line 502, the request for packet switched data (an Internet service request) is forwarded directly to Internet service provider 414. Internet service provider 414 responds by providing packet switched Internet data services which are returned over leased line 502 to the base station auxiliary transmission apparatus 404 which transmits the packet switched data via base station auxiliary antenna 403 over the sectorized downlink beam on a downlink distribution channel carried on an unpaired downlink carrier frequency. The downlink distribution channel is received by a plurality of subscriber radio terminals, including the subscriber radio terminal which originated the packet switched data requesting the Internet service data. User terminal 416 connected to the subscriber radio terminal which originated the request for Internet service data receives the retrieved packet switched Internet service data and recognizes that the Internet service data is addressed to itself, by virtue of the conventional Internet protocol.

Alternatively, where leased line 502 is not used, base station auxiliary transmission apparatus 404 signals to base station main transceiver 402 over internal bus 501 to set up a circuit switched modem call over back haul link 412 to local exchange 413 and Internet service provider 414. The packet switched service request for packet switched Internet service data is sent from base station main transceiver 402 across the circuit switched connection to Internet service provider 414. Internet service provider responds by providing Internet service data over the circuit switched connection which is received at base station main transceiver 402. On receipt of the packet switched Internet service data, base station main transceiver 402 forwards this packet switched data over internal bus 501 to base station auxiliary transmission apparatus 404 which transmits the packet switched data (Internet service data) over a downlink distribution channel carried on an unpaired downlink frequency which is received by the subscriber radio terminal originating the service request. User terminal 416 connected to the appropriate radio subscriber terminal receives the packet switched Internet service data and recognizes that data according to the conventional Internet protocol.

Effectively, the base station main transceiver 402 acts as a proxy server for the base station auxiliary transmission apparatus 404, by setting up circuit switched calls in response to signals received from base station auxiliary transmission apparatus 404.

For example, user terminal 416 may have an Internet protocol address 47.10.11.1. However, when user terminal 416 sends a request for Internet service data (packet switched data) into the subscriber radio terminal, this information is translated into a network identification data (NID) and network port address (NPA) data, that is to say an address which is recognized by the conventional fixed wireless transmission protocols. Additionally, identification data used internally by the fixed wireless access system may be appended to the IP address, for example a user ID number, identifying the subscriber, and a group identification number, identifying a group of subscribers sharing a downlink distribution channel. This identification information helps to distinguish between different user terminals attached to a single subscriber radio terminal. Thus, the Internet application layer address 47.10.11.1 which is understood by Internet service provider 414 is interworked with address data specific to the fixed wireless access system prior to transmission over the wireless link on the uplink contention access channel. On receipt at the base station, base station main transceiver 402 sends the interworked data to the base station auxiliary transmission apparatus 404 which translates the interworked data back into a format which is understandable by Internet service provider 414. Base station auxiliary transmission apparatus 404 achieves translation through use of a look up table which maps IP address against subscriber lines of the subscriber radio terminal. For example, where user terminal 416 has a registered internal address 101. Within the mapping table in base station auxiliary transmission apparatus 404, there exists mappings between IP address and NID/NPA. For example:

47.11.11.2---10003/1

IP address NID/NPA

The auxiliary downlink transmitter 404 may transmit continuously, with a relatively large proportion of transmission bandwidth being utilized for data, as a requirement for ramp-up and ramp-down periods being reduced. This ramp-up and ramp-down time is a consequence of the need for an initiation and termination of each individual transmission to each subscriber.

In the uplink direction, advantage may be taken of the spectrum utilization asymmetry between the access (uplink) and broadcast (downlink) channels. The bandwidth of the downlink of a fixed wireless access system is usually fixed compared with that of the access channel, which tends to increase in accordance with the number of RF carriers. For example one ALOHA slot per RF carrier. This is because the sector broadcast information remains identical across all the RF carriers within a sector. This makes it possible to use the spare capacity for the low throughput Internet traffic in the uplink direction.

Advantageously, since the specific embodiments and methods of the present invention do not rely upon a conventional air interface protocol (AIP) of a symmetric fixed wireless access system, conceptually, an overlaid system bypassing both the air interface protocol and the switch interface protocol stack is possible. The fixed wireless access system is effectively used as a proxy router to an Internet access service node for uplink messages. The overlay system may have its own transmission only, low-cost radio co-located with the existing fixed wireless access at the base station site. For the subscriber system, one may have either a separate system for this service, or a combined user terminal.

In the prior art case FIG. 3, in a frequency plan for a tri-sectorized arrangement, there are 18 downlink carrier frequencies per cell (6 downlink carrier frequencies per sector) and each downlink carrier frequency is paired with a corresponding respective uplink carrier frequency in a time division multiplexed frequency division duplex pair. Requests for connections are received at the base station on one or more access channels and available bearers are broadcast to all subscribers in the sector over a downlink broadcast frequency.

In a specific implementation presented herein, each sector operates 6 paired downlink carrier frequencies assigned for circuit switched communications and one or more downlink broadcast frequencies and at least one unpaired downlink frequency which is used to transmit packet switched data. On the uplink, each subscriber communicates circuit switched communications over a paired uplink carrier frequency, and requests for circuit switched connections by the subscribers are made on a set of access channels on the paired uplink carrier frequencies in accordance with a standard prior art contention protocol, eg the known slotted ALOHA protocol. Additionally, subscribers make requests for packet switched service data on the access channels, and may also send short packet messages over the access channels, eg short e-mail messages.

Specific embodiments and methods of the present invention may enable seamless integration and overlay of an asymmetric data network with existing fixed wireless access networks. Also enabled are use of simplified base station radio equipment for the additional unpaired downlink frequency, which requires only a transmit capability. The use of a packet mode downlink protocol also allows efficient utilization of available downlink bandwidth.

In the specific implementation presented herein, as the subscriber radio terminals are mounted with highly directional antennas, the downlinks of the fixed wireless access network are generally less vulnerable to interference than the uplinks. This may enable an overlayed downlink frequency reuse scheme to be employed on the auxiliary downlink beam without causing excessive interference to symmetric traffic using the same network. For instance, in a tri-sectored deployment scenario, the auxiliary downlink beam of each sector may reuse a selected frequency from the same frequency reuse group, thereby providing a total of 3 extra downlink frequencies per cell.

An alternative method investigated by the inventors may be inefficient concerning usage of uplink bandwidth by comparison with the approach presented herein. In particular in the alternative method, circuit switched systems makes use of existing technology, and sets up a circuit switch call for each communication, giving rise to inefficient use of bandwidth and an overhead of multiple call set-up and tear-down over the period of a subscriber Internet session. This both increases subscriber access costs and ties up available bandwidth unnecessarily.

Whilst the first embodiment herein is directed specifically at a fixed wireless access network, it will be appreciated by the person skilled in the art that the broad concept and method presented herein is equally applicable to satellite broadcast transmissions. In this case, a satellite footprint downlink beam is broadcast to a plurality of subscriber receivers equipped with satellite dishes. Backhaul transmission line 107 is replaced by a ground-satellite link 706 to ground station 708 connected to Internet service provider 707. In the satellite communications scenario, the Internet service provider transmits data to the satellite, and the service data signals are transmitted in a general broadcast footprint area 705 covered by the satellite. The satellite effectively acts as a proxy server for obtaining service Internet service data in response to a plurality of service requests received from subscriber satellite transceivers 703, 704.

| Abbreviations | |
|---|---|
| AIP | Air Interface Protocol |
| AMPS | Advanced Mobile Phone System |
| ARQ | Automatic Retransmission Request |
| CDMA | Code Division Multiple Access |
| CNIR | Carrier to Noise and Interference Ratio |
| FTP | File Transfer Protocol |
| FWA | Fixed Wireless Access |
| IASS | Internet Access Subscriber System |
| IP | Internet Protocol |
| PCS | Personal Communications System |
| PSTN | Public Switched Telephone Network |
| TCP | Transmission Control Protocol |
| WWW | World Wide Web |

What is claimed is:

1. A radio base station comprising:
   a first antenna and a transceiver apparatus configured to operate a plurality of duplex channel pairs each comprising an uplink channel and a downlink channel;
   a second antenna and a transmitter apparatus configured for transmitting packet switched data on at least one unpaired downlink channel;
   means for distinguishing between service request signals for packet switched data services and connection request signals for circuit switched services received on said uplink channel of at least one of said duplex channel pairs; and
   means for routing packet switched data received in response to said service request signals, to said second antenna and said transmitter apparatus for transmission on the unpaired downlink channel,
   wherein said transmitter apparatus does not have an associated receiver apparatus.

2. A radio base station according to claim 1 in which the duplex channel pairs are frequency division duplex pairs and in which the unpaired downlink channel is a frequency division channel.

3. A radio base station according to claim 1 in which said uplink channel of said at least one of said duplex channel pairs is a contention access channel.

4. A radio base station according to claim 3 in which said contention access channel is a slotted ALOHA channel.

5. A radio base station according to claim 1 in which uplink and downlink data rates associated with said service request signals and service data are asymmetric.

6. A radio base station according to claim 1 configured for use in a fixed wireless access network.

7. A radio base station according to claim 1 arranged to operate a plurality of sectorized beams, and in which at least one unpaired downlink channel is provided for each of said sectorized beams.

8. A radio base station according to claim 1, further comprising:
   a link for connecting said transmitter apparatus to an internet service provider.

9. A method of operating a radio basestation, comprising the steps of:
   receiving a signal comprising service request signals for packet switched data services and connection request signals for circuit switched services received on an uplink channel of a duplex channel pair via a first antenna and a transceiver apparatus;
   distinguishing between said service request signals and said connection request signals;
   using said duplex channel pair for provision of said circuit switched services,
   and transmitting packet switched data received in response to said service request signals on an unpaired downlink channel from a second antenna and a transmitter apparatus,
   wherein said transmitter apparatus does not have an associated receiver apparatus.

10. A method according to claim 9 in which the channel pair is a frequency division duplex pair and in which the unpaired downlink channel is a frequency division channel.

11. A radio basestation, comprising:
   a receiver for receiving a signal comprising service request signals for packet switched data services and connection request signals for circuit switched services received on an uplink channel of a duplex channel pair;
   apparatus for distinguishing between said service request signals and said connection request signals;
   a first transmitter for transmitting service data received in response to said service request signals on an unpaired downlink channel; and
   a second transmitter associated with said receiver for provision of said circuit switched services over said duplex channel pair,
   wherein said first transmitter does not have an associated receiver apparatus.

* * * * *